United States Patent [19]
Flad

[11] 3,947,092
[45] Mar. 30, 1976

[54] OPTICAL ARRANGEMENT FOR ILLUMINATING AN OBJECT WITH THE LIGHT OF A SHARPLY LIMITED SPECTRAL REGION OF THE RADIATION OF A LUMINOUS SOURCE

[75] Inventor: Hermann Flad, Triesen, Liechtenstein

[73] Assignee: Balzers Patent- und Beteiligungs AG, Liechtenstein

[22] Filed: Nov. 8, 1974

[21] Appl. No.: 522,314

[30] Foreign Application Priority Data
Nov. 12, 1973 Switzerland...................... 015833/73

[52] U.S. Cl. ................................................. 350/171
[51] Int. Cl.² ........................................ G02B 27/14
[58] Field of Search ............................ 350/171, 172

[56] References Cited
UNITED STATES PATENTS

| | | | |
|---|---|---|---|
| 3,623,797 | 11/1971 | Daw .............................. | 350/172 X |
| 3,726,192 | 4/1973 | Dalton ............................ | 350/171 |
| 3,860,813 | 1/1975 | Herzog et al. ................ | 350/171 X |

*Primary Examiner*—Davis L. Willis
*Attorney, Agent, or Firm*—McGlew and Tuttle

[57] ABSTRACT

A light beam splitter comprises a light transmissive support which comprises a colored glass having an absorption edge spectrally limiting the reflection of the light splitter. A multilayer interference coating is applied to the colored glass and it includes two adjacent filter spectral region working ranges and it transmits one spectral region of one filter working range and reflects the other adjacent working range. The interference coating has a ratio of optical thickness of the low refraction to the high refractive layers of from 1 to 2 to 1 to 9. The colored glass support is advantageously formed with an absorption edge at the short wave side of the wave length centroid of the spectral region to be reflected by the light splitter.

2 Claims, 5 Drawing Figures

OPTICAL ARRANGEMENT FOR ILLUMINATING AN OBJECT WITH THE LIGHT OF A SHARPLY LIMITED SPECTRAL REGION OF THE RADIATION OF A LUMINOUS SOURCE

DESCRIPTION OF THE PRIOR ART

In certain illumination systems with deflected paths of rays (such as fluorescence miscroscopes, fluorescence cameras, film printers), beam splitters are desirable to ensure an intensity of illumination as high as possible in a definite, narrow spectral region and, at the same time, to fully absorb the light beam in a spectrally adjacent region and to transmit other regions as completely as possible.

In such cases, the thermal load capacity is to be as high as possible. I.e., with the usual, predominantly infrared light emitting light sources, the spectral absorption region is to be located at the shortwave side.

SUMMARY OF THE INVENTION

The invention provides a beam splitter having the above-mentioned characteristics and constructed with a minimum of expenditure and by means of a single optical element. Thus, for example, due to the invention, a conventional microscope equipped for observation in transmitted and direct light may be converted into a fluorescence microscope. For a selective use of a microscope in the one or the other mode of operation, a slider or turret may be provided so that if required, alternately a neutral light splitter or an inventive beam splitter can be placed into the path of rays.

If higher standards are to be applied, a further transmission filter is positioned both in the path of the illumination rays and in the path of the observation rays.

In a beam splitter in accordance with the invention, comprising a multilayer interference coating applied to a light-transmissive support transmitting one spectral region of the filter working range and reflecting another, adjacent spectral region, the support is designed as a colored glass comprising an absorption edge spectrally limiting the reflection of the light splitter, and in the interference coating, the ratio of optical thicknesses of the low refraction to the highly refractive layers is 1:2 to 1:9.

At an oblique incidence, usual quarter-wave interference systems show a strong splitting into the two polarization components Tp and Ts (FIG. 5) so that the resulting transmission curve $T_M$ for natural light becomes flattened whereby the spectral separation of natural light is extended to a large wave-length range.

As it is well known, the curve $T_M$ is given by the formula $T_M = (Tp + Ts)/2$. In the inventive beam splitter, the two component curves are brought close to each other by an appropriate selection of the thicknesses of the individual highly refractive and low-refraction layers and a corresponding choice of their thickness ratio, so that a steeper slope of the spectral edge for the resulting curve of natural light and thereby a better separation of the reflection and transmission regions is obtained. Such a specific structure of the interference system can be obtained, for example, by providing a relation of the optical thicknesses of the low-refraction layers to the highly refractive layers in the proportion of 1:2 to 1:9. Interference systems of this kind are described, for example, in the "Handbook of Optical Design" by Baumeister, Section 2a, U.S. Government Printing Office, Washington, D.C. Preferably, for the desired reflection in the region of the fluorogenic light, the reflection range of the second or third, or a higher order of the basic system is used. The spectral steepness of the transmission curve (expressed in percent per nm) can therefore be improved by the factor 3.

Due to such a design of the beam splitter, the limitation of the reflection band of the interference system can be controlled in accordance with the requirements, and the remaining reflection band width is reducible practically to any desired extent. Up to date, limited reflection bands can be obtained only by providing a particular structure of the interference system, and even this, only for relatively wide reflection bands.

Accordingly it is an object of the invention to provide a light beam splitter which comprises a colored glass light transmissive support having a multilayer interference coating which includes two adjacent filter spectral region working ranges and which transmit one spectral region of one filter working range and reflects the other and wherein the interference coating has a ratio of optical thickness of the lower refraction to the highly refractive layers of from 1 to 2 to 1 to 9.

A further object of the invention is to provide a microscope having a light beam splitter which may be positioned in the path of the light rays and which comprises a multilayer interference coating applied to a colored glass light transmissive support which transmits one spectral region of one filter working range and reflects another and which is provided with an interference coating having an optical thickness of the low refraction to the high refractive layers of from 1 to 2 to 1 to 9.

A further object of the invention is to provide a film printer having a light beam splitter of the invention.

A further object of the invention is to provide a light beam splitter, a microscope and a film printer which is simple in design, rugged in construction and economical to manufacture.

For an understanding of the principles of the invention, reference is made to the following description of typical embodiments thereof as illustrated in the accompanying drawings.

GENERAL DESCRIPTION OF THE PREFERRED EMBODIMENTS

Figure 1:
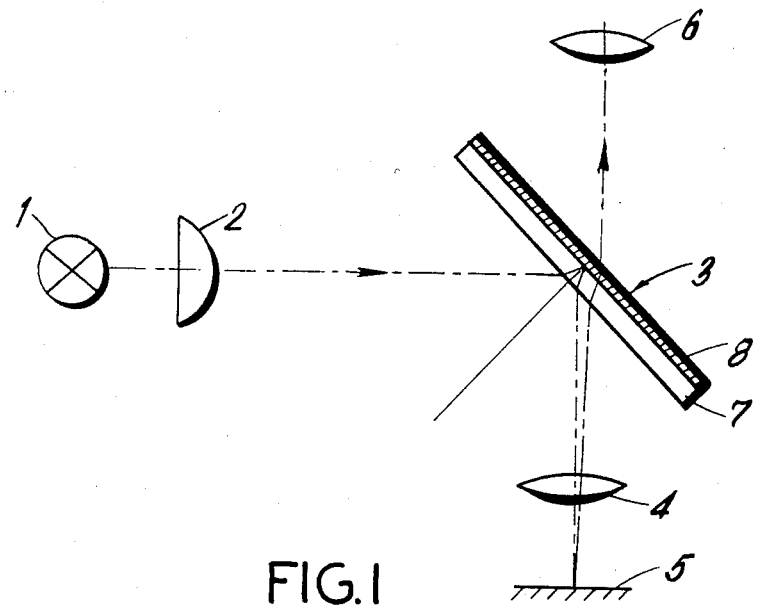
FIG. 1 is a diagrammatic representation of a microscope having a light beam splitter constructed in accordance with the invention.

Referring to the drawing the inventive beam embodied therein comprises a microscope which includes the tungsten lamp light source 1 which is directed to an object 5 through a condenser 2, a beam splitter 3, which is constructed in accordance with the invention and which is positioned in the path of the rays at an angle of 45°, and an objective 4. The light reflected from the object 5 passes through the objective 4 and the beam splitter 3 and the eyepiece 6 into the eye of the observer. A portion of the light is reflected from the object 5 and is lost by reflection on the beam splitter 3. In the example of the microscope shown in FIG. 1 an object containing a specific fluorescent substance (for example, fluorescein-iso-thiocyanate) is to be irradiated only by such light which is necessary for exciting the fluorescence. FIG. 2 shows the respective spectral situation in this case. Curve Ex represents the spectral sensitivity of the substance responding to the excitation, and curve Em shows the spectral distribution of the radiation produced by the fluorescence. The two curves overlap to a small extent.

As far as possible, the object is to be irradiated by a light only in the spectral range $K_A$–$K_R$, while the emitted fluorescent light within the $E_M$ range is to be directed with the greatest possible efficiency to the eye of the observer. However, to obtain a high contrast of fluorescence, the irradiative excitation light is to be kept away from the eye as much as possible. The sensitivity of the fluorescence method substantially depends on the satisfactory separation of the exciting light from the excited light. In addition, the exciting light should not contain any further, shortwave components in the AF region which, due to an autofluorescence of the medium, could reduce the desired contrast in the fluorescence image or even cause a contrast-conditioned wrong interpretation of the examined image. That is why a complete suppression of this shortwave region is of extraordinary importance, particularly if light sources with a strong ultraviolet component are used.

Figure 3:
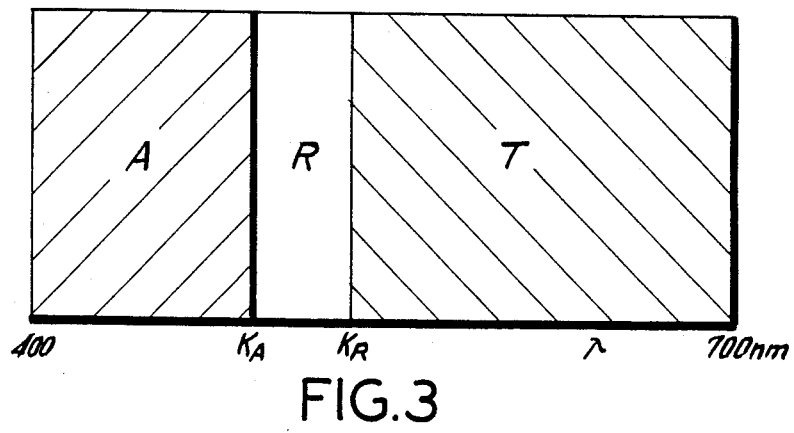
FIG. 3 is another curve showing the ideal spectral characteristic of a beam splitter.

FIG. 3 shows the ideal spectral characteristic of a beam splitter in an application according to the foregoing example. As it is evident, region A up to edge KA should be completely suppressed. Region R, on the contrary, covering the light useful for the fluorescence excitation, should be reflected as completely as possible, while region T corresponding to fluorescence light useful for producing the image should be fully transmitted.

A beam splitter largely complying with these requirements may be designed, in accordance with the invention, as follows:

An interference coating 8 is applied to a colored glass 7 which largely absorbs the radiation of region A and whose absorption edge slopes down at KA (at the shortwave side of the maximum of the irradiation exciting the fluorescence). The interference coating comprises a pack of alternately highly refractive and low-refraction layers.

The ratio of the optical thicknesses of the highly refractive layers to the low-refraction layers is 5:1. The optical thickness is the product $n \cdot d$, where $n$ is the index of refraction and $d$ is the geometric thickness of the respective substance. For example, titanium dioxide having an index of refraction of $n_1 = 2.3$ may be used as the highly refractive substance and silicon dioxide having an index of refraction of $n_2 = 1.47$ may be used as the low-refraction substance.

In the present example, assume that the long edge of the second order of the interference system is used as the reflection edge. Should the reflection maximum of the second order be situated, for example, at the wave length of 460 nm, the reflection maximum would have to be at 920 nm. However, because of the dispersion of the used substances, particularly of titanium dioxide, the reflection maximum of the first order is situated approximately at 885 nm. Consequently, the calculation of the interference system must start from this basic wave length $\lambda_0 = 885$ nm. To ensure a summation of the reflection vectors in proper phase relation, the condition $n_1 d_1 + n_2 d_2 = \lambda_0 /2$ (equation 1) must be satisfied, where $n_1$ is the index of refraction of the highly refractive substance, $d_1$ is its geometric thickness, and $n_2$ and $d_2$ are the corresponding values of the low-refraction substance.

In addition, the following conditions must be satisfied in the above example:

$$n_1 d_1 = 5\ n_2 d_2 \quad (2)$$

By substituting equation 2 in equation 1:

$$5\ n_2 d_2 = n_2 d_2 = \lambda_0/2$$

$$n_2 d_2 = \lambda_0/12$$

Thus, $$n_1 d_1 = 5\ \lambda_0/12$$

For $\lambda_0 = 885$ nm, the result is $$d_1 = 5\ \lambda_0/12 n_1 = 160.3 \text{ nm}$$

$$d_2 = \lambda_0/12 n_2 = 50.2 \text{ nm}$$

The entire interference system is a structure of 16 individual layers. The substrate is a colored glass having an index of refraction of $n_3 = 1.52$. The medium adjacent to the layer system is air having $n_4 = 1$. The angle of incidence is 45 degrees. To obtain a transmission as high as possible in the main transmission range, seven of the 16 layers are varied in their thickness for a so-called reflection reduction.

Then, the structure of the complete system is as follows:

| Substrate | Colored glass | Geom. thickness d in nm |
|---|---|---|
| Layer 1 | Titanium dioxide (T) | 149.3 |
| Layer 2 | Silicon dioxide (S) | 44.5 |
| Layer 3 | T | 158.0 |
| Layer 4 | S | 52.2 |
| Layer 5, 7, 9, 11, 13 | T | 160.3 |
| Layer 6, 8, 10, 12 | S | 50.2 |
| Layer 14 | S | 39.8 |
| Layer 15 | T | 151.2 |
| Layer 16 | S | 122.5 |
| Adjacent medium | | Air |

Figure 4:
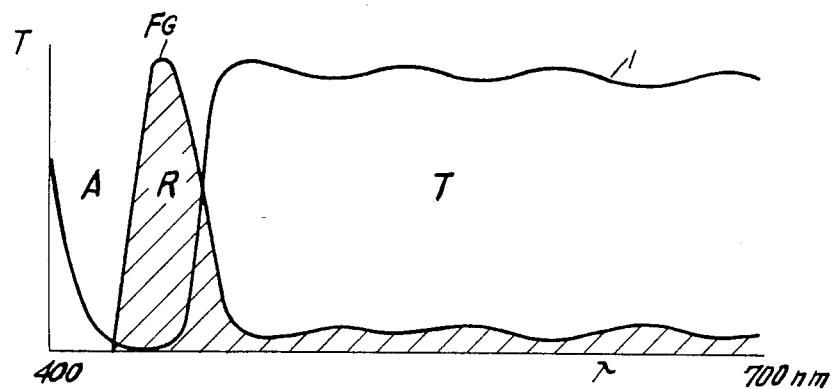
FIG. 4 is another curve indicating the spectral effect of the beam splitter constructed in accordance with the invention and indicates the transmission curve of the interference coating and the absorption curve of the colored glass support.
Figure 5:
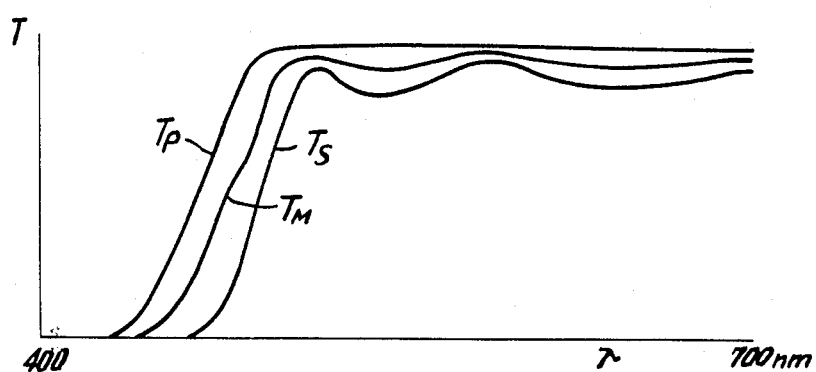
FIG. 5 indicates a quarter wave interference system which splits into two polarization components and indicating the resulting transmission curve for natural light.

With this structure of the coating, a so-called edge filter is obtained with the edge located near KR (FIG. 2) so that the shortwave radiation is practically completely reflected while the longer waves are transmitted. By combining the mentioned colored glass with the interference coating, an overall system is obtained having a spectral effect which, for the discussed example, is represented in FIG. 4. This figure shows the transmission curve I of the interference coating and the absorption curve FG of the colored glass.

Figure 2:
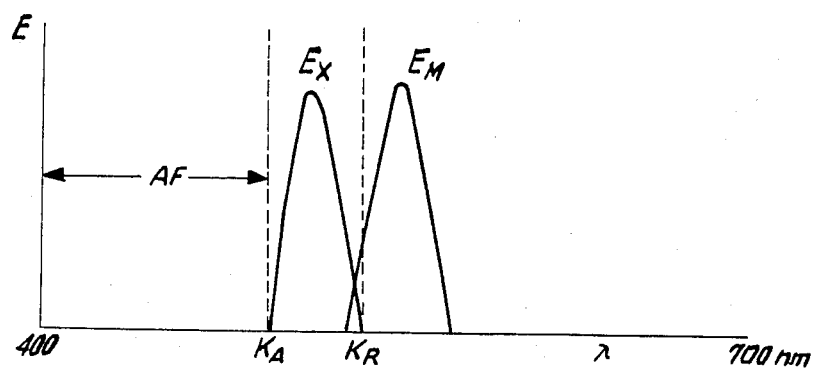
FIG. 2 is a curve showing the spectral sensitivity and the specral distribution of radiation produced by a fluorescent surface.

As used with a fluorescence microscope, the inventive beam splitter (as shown in FIG. 1) is positioned so that the interference coating is located at the side of the colored glass which is remote from the light source.

Therefore, the undesirable (small) residual absorption of the colored glass in the transmission range produces its effect only once. The regions R and T are thus largely characterized by the interference system because the transmission of the colored glass in these regions, due to the single passage amounts to almost 100%. Region A, on the contrary, is almost completely absorbed due to the passage twice through the colored glass.

The invention which has been explained in application to a fluorescence microscope can, of course, be used also for other purposes. For example, in film printers, it is necessary to separate three different, sharply limited spectral ranges of radiation of a light source in order to be able to make a color correction by separately controlling the individual color channels during the printing of color film. In contrast to the filter arrangements hitherto used for this purpose, the invention makes it possible to single out the individual color bands in an advantageous manner. The main advantage is that the ranges can be selected substantially smaller than up to date, with the result that troublesome overlappings of the individual color channels are avoided.

While specific embodiments of the invention have been shown and described in detail to illustrate the application of the principles of the invention, it will be understood that the invention may be embodied otherwise without departing from such principles.

What is claimed is:

1. A light beam splitter comprising a light transmissive colored glass support having one side exposed to light rays for passage of the rays therethrough and an opposite side, a multilayer interference coating applied to said light transmissive support opposite side and comprising a system of a plurality of alternately arranged highly refractory and low refraction layers having thicknesses which are dimensioned so that there are two adjacent filter spectral region working ranges, one of said ranges which is at the short side being transmitted and another range which is at the long side of the spectral range being reflected, said support having an absorption edge spectrally limiting the reflection of said system at the short wave side, said interference coating having a ratio of optical thickness of the low refraction to the highly refractory layers of from 1 to 2 up to 1 to 9.

2. an optical arrangement for illuminating an object with the light of a sharply limited spectral region of the radiation of a luminous source, preferably for film copying apparatus for carrying out color corrections, including a beam splitter provided in the path of the light to be filtered, and a light transmitting substrate having one side exposed to the light for passage therethrough and an opposite side, a multilayer interference coating on said opposite side comprising a system of alternately highly refractory and low-refraction layers having thicknesses which are dimensioned so that the one spectral range at the short wave side is transmitted and another adjacent spectral range at the longer wave side is reflected, and wherein said substrate has a spectral absorption edge limiting the reflection of the multilayer system at the short-wave side, and in the multilayer system, the ratio of optical thicknesses of the low refraction to the high refraction layers is between 1 to 2 and 1 to 9, and said splitter being positioned in the path of the light in a manner such that the light to be filtered passes through the absorbing substrate to the multilayer system.

* * * * *